M. M. CAMP
Methods of Forming Metal-Seams.

No. 157,492.  Patented Dec. 8, 1874.

WITNESSES:
A. W. Almqvist
A. F. Terry

INVENTOR:
Mortimer M. Camp
BY Munn & Co
ATTORNEYS.

UNITED STATES PATENT OFFICE.

MORTIMER M. CAMP, OF NEW HAVEN, CONNECTICUT.

IMPROVEMENT IN METHODS OF FORMING METAL SEAMS.

Specification forming part of Letters Patent No. 157,492, dated December 8, 1874; application filed October 24, 1874.

*To all whom it may concern:*

Figure 1:
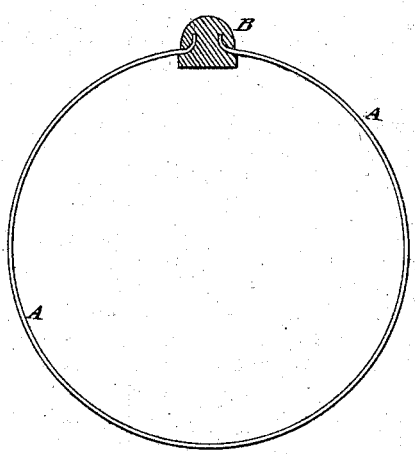
Figure 2:

Be it known that I, MORTIMER M. CAMP, of New Haven, in the county of New Haven and State of Connecticut, have invented a new and useful Improvement in Seams for Water-Pipes, &c., of which the following is a specification:

Figure 1 is a cross-section of a pipe to which my improved seam has been applied. Fig. 2 is a detail cross-section of the seam-bar before being applied to the pipe-shell.

Similar letters of reference indicate corresponding parts.

My invention has for its object to furnish an improved seam for round, oval, square, and other-shaped water and other sheet-metal pipes, which shall hold the edges of the pipe-shell securely, and shall be absolutely water-tight.

The invention consists in a pipe-seam formed by securing the curved edges of the shell in the longitudinal side grooves of the bar by pressing the metal of said bar down upon the said curved edges, as hereinafter fully described.

A represents the shell of the pipe, which is made of any desired length and size, and of a thickness depending upon the size of the pipe, and the purpose for which it is to be used. The side edges of the shell A are slightly curved outward, as shown in Fig. 1. B is the seam-bar, which is made of the same length as the pipe, and of a breadth and thickness depending upon the size of the pipe, and the pressure to which it will be exposed. The bar B is made with longitudinal recesses or grooves in its sides, giving it somewhat the appearance of a railroad-rail, as shown in Fig. 2.

In forming the pipe, the bar B is laid in a longitudinal groove in the side of a form of the shape and size of the required pipe. The shell A is then bent around this form and clamped to it, with its side edges in the side grooves of the seam-bar B. The form, shell, and seam-bar are then passed through suitable rolls, which close down the side flanges of the bar B upon the curved edges of the shell A, firmly embedding said side edges in the metal of the said bar, as shown in Fig. 1, where they will be held so firmly that the shell may be torn apart before its edges can be withdrawn from the bar B.

Having thus described my invention, I claim as new and desire to secure by Letters Patent—

The method of uniting or seaming the edges of the shell or pipe A by means of the grooved flexible metal bar B, the said edges being inserted in the grooves, and the metal clamped or compressed thereon, as shown and described.

MORTIMER M. CAMP.

Witnesses:
C. R. WELLS,
A. B. JACOCKS.